United States Patent
Choi et al.

(10) Patent No.: US 10,367,884 B2
(45) Date of Patent: *Jul. 30, 2019

(54) CONTENTS SHARING METHOD BETWEEN MOBILE TERMINAL AND LOCAL SERVER

(71) Applicant: SAMSUNG ELECTRONICS CO., LTD., Suwon-si (KR)

(72) Inventors: Yang-lim Choi, Seongnam-si (KR); Su-hyun Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 282 days.

This patent is subject to a terminal disclaimer.

(21) Appl. No.: 14/924,380

(22) Filed: Oct. 27, 2015

(65) Prior Publication Data

US 2016/0050268 A1 Feb. 18, 2016

Related U.S. Application Data

(63) Continuation of application No. 11/645,594, filed on Dec. 27, 2006, now Pat. No. 9,197,641.

(30) Foreign Application Priority Data

Aug. 1, 2006 (KR) .......................... 10-2006-0072693

(51) Int. Cl.
*G06F 15/16* (2006.01)
*H04L 29/08* (2006.01)
(Continued)

(52) U.S. Cl.
CPC ........ *H04L 67/1068* (2013.01); *G06F 16/245* (2019.01); *G06F 21/10* (2013.01);
(Continued)

(58) Field of Classification Search
CPC .................................................. H04L 67/1068
See application file for complete search history.

(56) References Cited

U.S. PATENT DOCUMENTS 7,330,728 B1 *  2/2008  Moll ....................... H04W 4/02
                                                    455/432.1
2003/0028623 A1 *  2/2003  Hennessey ........ H04L 29/12113
                                                    709/219
(Continued)

FOREIGN PATENT DOCUMENTS

JP         2005215826 A      8/2005
KR    1020010097867 A      11/2001
(Continued)

OTHER PUBLICATIONS

Communication dated Jan. 18, 2008 issued by the Korean Intellectual Property Office in Korean Application No. 1020060072693.
(Continued)

*Primary Examiner* — Dustin Nguyen
*Assistant Examiner* — Joel Mesa
(74) *Attorney, Agent, or Firm* — Sughrue Mion, PLLC

(57) ABSTRACT

Provided is a contents sharing method between a mobile terminal and a local server. The contents sharing method between a client terminal storing metadata and a server terminal storing the metadata, the method comprising requesting the server terminal for a contents share service; and receiving information on contents corresponding to matching metadata as a result of comparing the metadata stored in the client terminal and the metadata stored in the server terminal, thereby sharing contents desired by the user without the user's intervention. Also, the user can communicate desired contents information with people in a bus, subway, library, etc., which forms a social network, and produces a contents flow between mobile terminals, thereby (Continued)

creating a new business model such as contents resale, promotion, etc.

13 Claims, 4 Drawing Sheets

(51) Int. Cl.
 G06F 16/245 (2019.01)
 G06F 21/10 (2013.01)
 H04L 29/06 (2006.01)
 H04W 72/04 (2009.01)
 H04W 76/14 (2018.01)

(52) U.S. Cl.
 CPC ......... *H04L 63/10* (2013.01); *H04W 72/0453* (2013.01); *H04W 76/14* (2018.02); *H04L 2463/101* (2013.01)

(56) References Cited

U.S. PATENT DOCUMENTS

| | | | |
|---|---|---|---|
| 2005/0075999 A1 | 4/2005 | Kojima et al. | |
| 2005/0182791 A1 | 8/2005 | Lim et al. | |
| 2005/0278307 A1* | 12/2005 | Battagin | ................ G06F 16/25 |
| 2006/0059168 A1 | 3/2006 | Hamada et al. | |
| 2006/0143435 A1 | 6/2006 | Kwon | |
| 2006/0184648 A1* | 8/2006 | Ohsumi | .............. G06F 16/9535 709/219 |

FOREIGN PATENT DOCUMENTS

| | | |
|---|---|---|
| KR | 2003-0094163 A | 12/2003 |
| KR | 10-2004-0009155 A | 1/2004 |
| KR | 1020040012311 A | 2/2004 |
| KR | 1020040105675 A | 12/2004 |
| KR | 1020050049959 A | 5/2005 |
| KR | 10-2005-0102522 A | 10/2005 |
| KR | 1020060023857 A | 3/2006 |
| KR | 1020060075532 A | 7/2006 |

OTHER PUBLICATIONS

Communication dated Mar. 7, 2012 issued by the State Intellectual Property Office of P.R. China in Chinese Application No. 200710005506.1.

Communication dated Feb. 4, 2013 issued by the State Intellectual Property Office of P.R. China in counterpart Chinese Patent Application No. 200710005506.1.

Communication issued by the State Intellectual Property Office of P.R. China dated Dec. 4, 2017 in counterpart Chinese Patent Application No. 201510946034.4.

\* cited by examiner

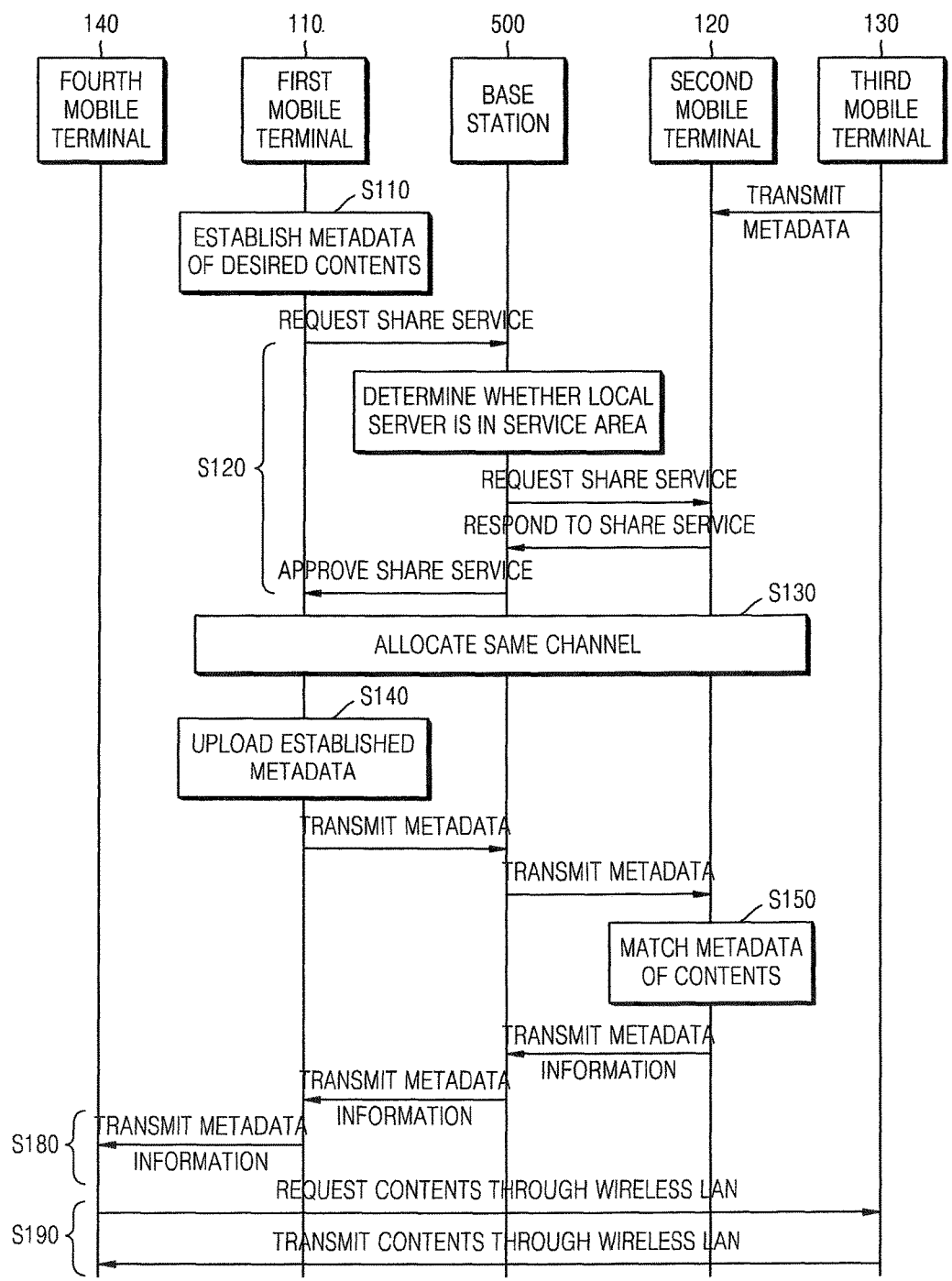

CONTENTS SHARING METHOD BETWEEN MOBILE TERMINAL AND LOCAL SERVER

This application is a Continuation of U.S. patent application Ser. No. 11/645,594, filed on Dec. 27, 2006 in the U.S. Patent and Trademark Office, which claims the priority of Korean Patent Application No. 10-2006-0072693, filed on Aug. 1, 2006, in the Korean Intellectual Property Office, the disclosure of which is incorporated herein in its entirety by reference.

BACKGROUND OF THE INVENTION

1. Field of the Invention

Methods consistent with present invention relate to contents sharing between a mobile terminal and a local server, and more particularly to, sharing contents required by a user using a mobile terminal via another user's local mobile terminal or a local server.

2. Description of the Related Art

A memory amount of mobile terminals has been increased. Mobile terminals store various contents such as bell sound, music files, images, video, games, various types of data, and so on through data communication.

Users obtain digital contents by purchasing storage media such as digital versatile discs (DVDs) or compact disks (CDs), using cyber money in Internet sites, or downloading peer-to-peer (P2P) software on personal computers (PCs).

However, users must visit stores personally to purchase storage media, and need a PC environment to obtain digital contents via Internet sites or P2P software, which requires users to log on each Internet site and search P2P software.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a mobile terminal by which a user can obtain desired contents via a local terminal or a local server.

According to an aspect of the present invention, there is provided a contents sharing method between a client terminal storing metadata and a server terminal storing the metadata, the method comprising: requesting the server terminal for a contents share service; and receiving information on contents corresponding to matching metadata as a result of comparing the metadata stored in the client terminal and the metadata stored in the server terminal.

New metadata is generated by inputting a keyword signal, related to the contents, into the client terminal in the form of metadata or based on previously established metadata and the new metadata is then stored in the client terminal.

The client terminal requests the contents share service from the server terminal using a contents share service protocol.

The information on the contents includes at least one of contents corresponding to the matching metadata, unique resource identifier (URI) information or license information of the contents, and the matching metadata itself.

The method further comprises, when the URI information of the contents corresponding to the matching metadata is received from the server terminal, accessing the URI through a wireless LAN, requesting transmission of the contents, and receiving the contents.

According to another aspect of the present invention, there is provided a contents share method between a client terminal storing metadata and a server terminal storing the metadata, the method comprising: receiving a request for a contents share service from the client terminal; and selectively transmitting information on contents corresponding to matching metadata as a result of comparing the metadata stored in the client terminal and stored metadata according to the request from the client terminal.

According to another aspect of the present invention, there is provided a contents share method between client terminals storing metadata and server terminals storing the metadata, the method comprising: as a result of comparing metadata stored in a first client terminal and metadata stored in a first server terminal, receiving contents information in which contents corresponding to matching metadata is stored in an external second server terminal from the first client terminal; requesting the second server terminal to transmit the contents; and receiving the contents from the second server terminal.

According to another aspect of the present invention, there is provided a client terminal that shares contents with a server terminal storing metadata, comprising: a communication module requesting the server terminal for a contents share service and transmitting metadata stored therein; and a controller comparing the metadata stored in the client terminal and the metadata stored in the server terminal and requesting transmission of information on contents corresponding to matching metadata.

According to another aspect of the present invention, there is provided a server terminal that shares contents with a client terminal storing metadata, comprising: a metadata generation module generating metadata of the contents; a metadata database storing the generated metadata; a communication module receiving a request for a contents share service from the client terminal and transmitting metadata stored therein; a metadata matching module comparing the generated metadata and the metadata received from the client terminal; and a controller selectively transmitting information on contents corresponding to matching metadata.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating a contents sharing method between mobile terminals and a local server according to another exemplary embodiment of the present invention.

DETAILED DESCRIPTION OF EXEMPLARY EMBODIMENTS OF THE INVENTION

Figure 1:
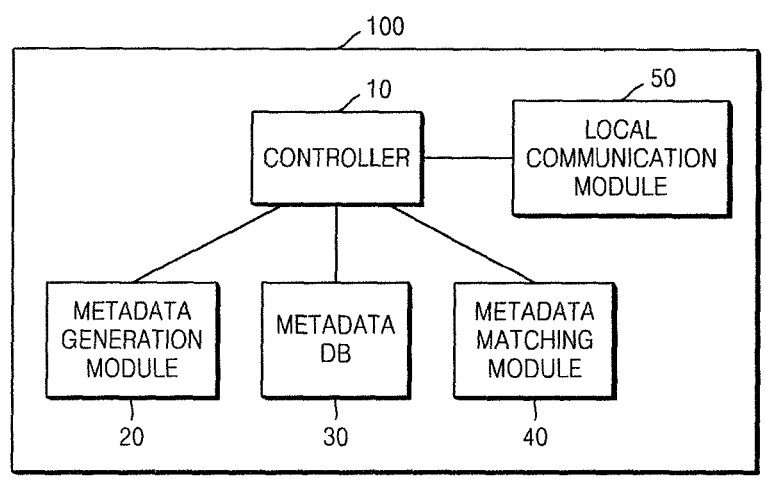
FIG. 1 is a block diagram of a mobile terminal according to an exemplary embodiment of the present invention.

The present invention will now be described more fully with reference to the accompanying drawings, in which exemplary embodiments of the invention are shown. Like reference numerals in the drawings denote like elements.

FIG. 1 is a block diagram of a mobile terminal 100 according to an exemplary embodiment of the present invention. Referring to FIG. 1, the mobile terminal 100 includes a controller 10, a metadata generation module 20, a metadata database (DB) 30, a metadata matching module 40, and a local communication module 50.

The controller 10 controls the metadata generation module 20, the metadata DB 30, the metadata matching module 40, and the local communication module 50, and, if metadata information stored in a local mobile terminal or a local server matches metadata, controls the transmission of contents corresponding to the matched metadata.

The metadata generation module 20 generates metadata information from the contents to be exchanged with another mobile terminal. For example, when a user obtains a music file as the contents, the metadata generation module 20 can generate metadata such as time when the contents are generated, a singer, genre, etc.

New metadata can be generated by a user by inputting a keyword signal associated with the contents in the form of metadata in the mobile terminal 100 or based on metadata.

The metadata DB 30 stores metadata generated by the metadata generation module 20 and can be shared with another mobile terminal. The metadata DB 30 stores contents information stored in the mobile terminal 100 and contents information owned by the user of the mobile terminal 100 that are stored on a Web server.

The metadata can be stored in the metadata DB 30 as in the current exemplary embodiment of the present invention or in the form of an extensible markup language (XML) document.

The metadata matching module 40 determines whether metadata matches metadata of the local terminal or the local server, and transmits the metadata or contents.

The local communication module 50 browses a local mobile terminal or the local server. The local communication module 50 communicates with the local mobile terminal or the local server via bluetooth, and, if the metadata or contents are stored in a remote controlled Web server, via a wireless local area network (LAN).

FIG. 1 illustrates the mobile terminal 100 for a server that transmits generated metadata if the mobile terminal 100 is requested to transmit contents. A mobile terminal for client that requests contents using stored metadata includes the controller 10 and the local communication module 50 whose functions are similar to the ones described above. Thus, their detailed description is omitted.

The operation of the mobile terminal 100, which shares contents information via the local server, will now be described with reference to FIGS. 2 through 4.

Figure 2:
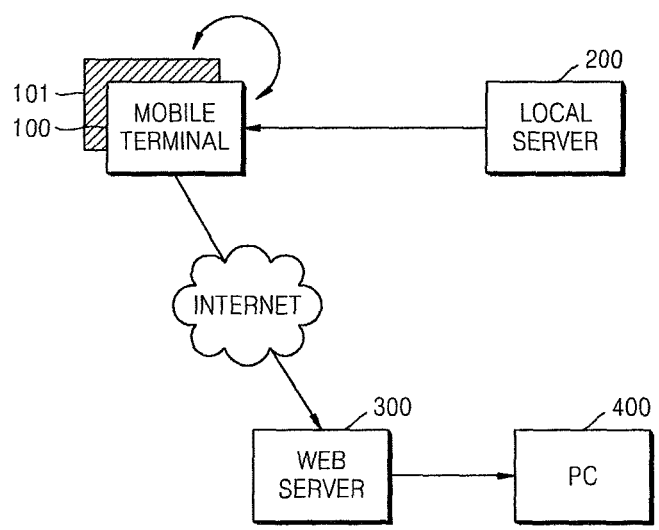
FIG. 2 is a block diagram of a contents sharing system using the mobile terminal according to an exemplary embodiment of the present invention.

FIG. 2 is a block diagram of a contents sharing system using the mobile terminal 100 according to an exemplary embodiment of the present invention.

Referring to FIG. 2, the mobile terminal 100 can share contents by matching contents between mobile terminals 100 and 101, from a local server 200, and by receiving contents location information from the mobile terminal 101 or the local server 200 and obtaining contents from a remote PC 400 via a web server 300.

To share contents by matching between the mobile terminals 100 and 101, metadata of contents stored in the mobile terminals 100 and 101 are compared, and, if the metadata match, the contents or contents information stored in the mobile terminals 100 and 101 are exchanged.

To transmit contents from the local server 200, metadata of contents stored in the mobile terminal 100 and the local server 200 are compared, and, if the metadata match, the contents or contents information stored in the mobile terminals 100 and the local server 200 are exchanged.

It is assumed that the PC 400 stores contents and metadata of the contents and transmits the same to the mobile terminal 101 or the local server 200. When the metadata stored in the mobile terminal 101 or the local server 200 match the metadata of the mobile terminal 100, the mobile terminal 100 attempts to access the PC 400 over the web server 300 using the wireless LAN and receives the contents.

Figure 3:
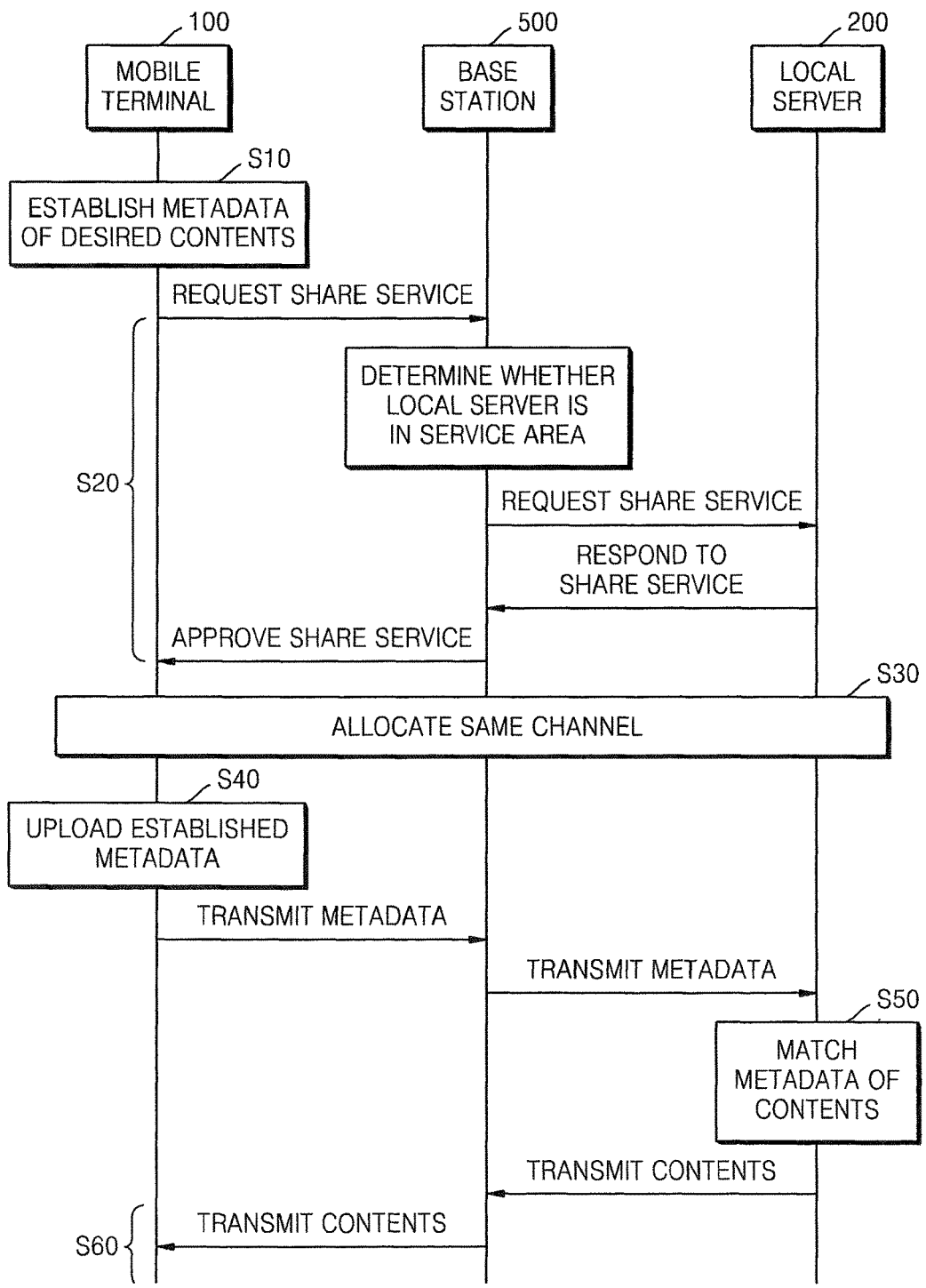
FIG. 3 is a flowchart illustrating a contents sharing method between the mobile terminal and the local server according to an exemplary embodiment of the present invention.

FIG. 3 is a flowchart illustrating a contents sharing method between the mobile terminal 100 and the local server 200 according to an exemplary embodiment of the present invention.

For descriptive convenience, the mobile terminal 100 is a client terminal that receives contents information and the local server 200 is a server terminal that transmits contents information to the mobile terminal 100.

The local server 200 includes the mobile terminal 100 and all the constituents of the mobile terminal 100. The local server 200 searches stored contents, generates metadata for the searched contents, and stores the metadata in a DB.

Referring to FIG. 3, a user establishes metadata of desired contents in the mobile terminal 100 (Operation S10).

Examples of the desired contents are a user's personal profile, a user's hobby, user's favorite song and real-time news break, writings newly uploaded on a homepage, video, a specific singer's song or someone else's contents favorites. That is, the metadata of contents can be direct information on contents or contents used record or contents favorite information. In addition, the metadata of contents can be a list of user's contents that can be exchanged with another person, metadata of contents or personal information on user's contents used record or favorite, etc.

The metadata of contents can be personally input by the user or generated by analyzing user's contents used history using the controller 10 of the mobile terminal 100. The metadata of contents can be at least one keyword that is a kind of index.

The mobile terminal 100 browses the local server 200 (Operation 20).

In detail, the mobile terminal 100 is carried by a user, the mobile terminal 100 browses the local server 200, which can exchange and share the metadata through the local communication module 50. The local communication module 50 can use a local communication means such as Bluetooth or a specific protocol, but is not limited to those means.

The mobile terminal 100 sends a request for a contents share service to a base station 500 using an available traffic channel. The base station 500 confirms that the local server 200 is in a service area, requests the contents share service from the local server 200 using the traffic channel, notifies the mobile terminal 100 if the contents share service is approved, and connects the contents share service to the local server 200.

The mobile terminal 100 and the local server 200 can perform a local communication in the service area of the base station 500.

The base station 500 allocates the same traffic channel to the mobile terminal 100 or the local server 200, temporarily stores contents information received from the local server 200, and acts as a buffer that transfers the contents information to the mobile terminal 100, which is the client terminal.

The contents share service is connected between the mobile terminal 100 and the local server 200. The base station 500 allocates the same traffic channel between the mobile terminal 100 and the local server 200 (Operation S30). The mobile terminal 100 transmits the metadata to the local server 200 according to the relay of the base station 500 using the allocated traffic channel.

In detail, the metadata established by the user or the controller 10 is uploaded through the local communication module 50 of the mobile terminal 100 (Operation S40). Therefore, if the metadata is transmitted to the base station 500 using the traffic channel, the base station 500 transmits the metadata to the local server 200.

The local server 200 compares the metadata of stored contents with metadata information uploaded from the mobile terminal 100 (Operation S50).

The metadata matching module 40 of the local server 200 browses metadata information that is common to the stored metadata DB 30 and the uploaded metadata information.

For example, when the uploaded metadata information is jazz music and the metadata DB 30 of the local server 200 stores jazz music, the metadata matching module 40 determines that there is a match.

When metadata information matches, the local server 200 transmits contents information based on the matched metadata information to the mobile terminal 100 (Operation S60). The contents information can be contents themselves, an address for obtaining contents, and/or metadata of contents.

If the traffic channel has a sufficient bandwidth and sufficient time, and desired contents are included in the local server 200, then the contents are directly transmitted or copied. However, if the above requirements are not satisfied, then only metadata of contents will be transferred. The metadata can be a unique resource identifier (URI) of source used to obtain desired contents, identifier ID information in a P2P network, or license information of the contents.

When the mobile terminal 100 performs a local communication with another mobile terminal acting as a server instead of the local server 200, the two mobile terminals can communicate, assign, and copy contents information in the same way as described above.

Digital rights management (DRM) can be applied to contents moved from the local server 200. In detail, used time, reproduction number, copy restriction, etc. can be applied to contents to which the DRM is applied. Therefore, when contents are not reproduced, but moved or copied, the user of the mobile terminal 100 that receives the contents can use the contents by paying an amount of money using the license information or the metadata transferred with the contents. When the mobile terminal 100 receives the metadata or license information of the contents without the contents, the contents can be obtained using the metadata and license information.

A contents sharing method by a user wherein the contents having matched metadata are stored in an external mobile terminal will now be described with reference to FIGS. 4 and 5.

Figure 4:
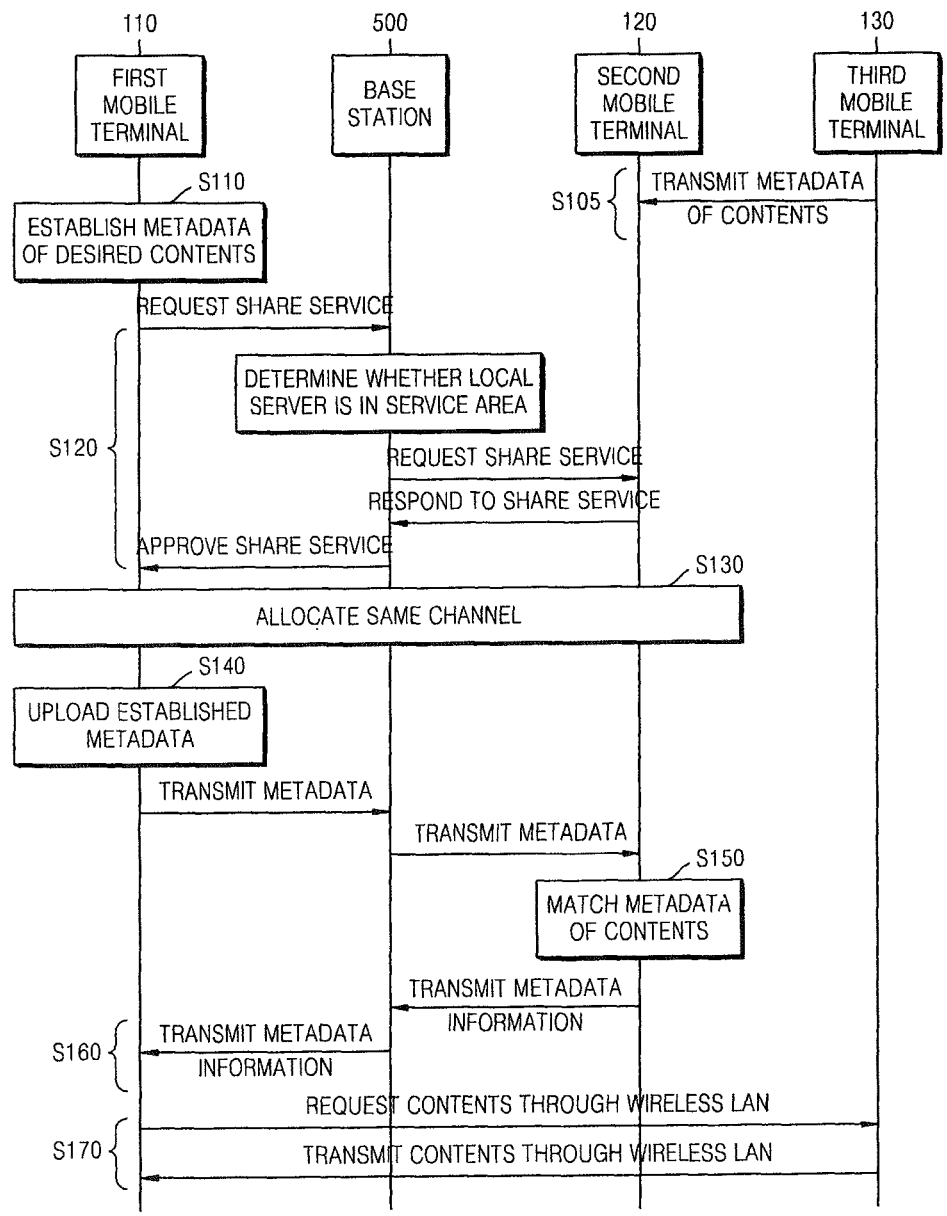
FIG. 4 is a flowchart illustrating a contents sharing method between mobile terminals and a local server according to another exemplary embodiment of the present invention.

FIG. 4 is a flowchart illustrating a contents sharing method between mobile terminals and a local server according to another exemplary embodiment of the present invention.

For the descriptive convenience, a first mobile terminal 100 which is a client terminal receiving contents information supports a wireless LAN, a second mobile terminal 120 is in a local area from the first mobile terminal 110 and corresponds to a local server, a third mobile terminal 130 is an external home PC or DVD, etc. Some metadata of contents stored in the third mobile terminal 130 is transmitted to the second mobile terminal 120 (Operation S105).

As illustrated in FIG. 3, a user establishes metadata of desired contents in the first mobile terminal 110 (Operation S110).

In detail, the metadata can be generated by inputting a keyword of the desired contents in the form of metadata, or analyzing a user's contents used history through the controller 10 of the first mobile terminal 110.

The first mobile terminal 110 browses a local mobile terminal or a local server (Operation S120).

While the user carrying the first mobile terminal 110 moves, the first mobile terminal 110 browses the local server, which can exchange and share metadata, using the local communication module 50. The local communication module 50 uses a local communication means such as, for example, Bluetooth or a specific protocol.

As illustrated in FIG. 4, the first mobile terminal 110 requests a contents share service from the base station 500 using an available traffic channel. The base station 500 confirms whether the local server is within a server area. If it is confirmed that the second mobile terminal 120 corresponding to the local server is within the service area, the base station 500 requests the contents share service from the second mobile terminal 120 using the traffic channel, notifies the first mobile terminal 110 when the contents share service is approved, and connects the contents share service to the second mobile terminal 120.

The contents share service is connected between the first mobile terminal 110 and the second mobile terminal 120. The base station 500 allocates the same traffic channel between the first mobile terminal 110 and the second mobile terminal 120 (Operation S130).

Metadata established by the user or the controller 10 is uploaded through the local communication module 50 of the first mobile terminal 110 (Operation 140), and is transmitted to the second mobile terminal 120 according to the relay of the base station 500.

The second mobile terminal 120 compares metadata stored in the metadata DB 30 with metadata information uploaded from the first mobile terminal 110 (Operation S150).

If the matching metadata is metadata of contents stored in the third mobile terminal 130, the second mobile terminal 120 transmits metadata information including a URI of the contents stored in the third mobile terminal 130, ID information in a P2P network, etc. to the first mobile terminal 110 through the base station 500 (Operation S160).

When the first mobile terminal 110 supports a wireless LAN, the first mobile terminal 110 requests contents corresponding to the matched metadata to the third mobile terminal 130 through the wireless LAN, and the third mobile terminal 130 transmits the contents to the first mobile terminal 110 through the wireless LAN (Operation S170).

When contents of the matching metadata are stored in an external terminal, if a client mobile terminal supports the wireless LAN, the user can receive contents stored in the external terminal using the wireless LAN.

FIG. 5 is a flowchart illustrating a contents sharing method between mobile terminals and a local server according to another exemplary embodiment of the present invention.

The current embodiment is similar to the previous embodiment illustrated in FIG. 4 except that the first mobile terminal 110 does not support a wireless LAN and the fourth mobile terminal 130 supports the wireless LAN. Thus, overlapping description is omitted.

Referring to FIG. 5, if the first mobile terminal 110 transmits established metadata to the second mobile terminal 120 (Operation S140), the second mobile terminal 120 compares metadata information stored in the metadata DB 30 with metadata information uploaded from the first mobile terminal 110 (Operation S150). When the matching metadata is metadata of contents stored in the third mobile terminal 130, the second mobile terminal 120 transmits metadata information including a URI of the contents stored in the third mobile terminal 130, ID information of a P2P network, etc. to the first mobile terminal 110 through the base station 500. The first mobile terminal 110 cannot request contents to the third mobile terminal 130 directly since it does not support the wireless LAN.

Therefore, a user transmits the metadata information stored in the first mobile terminal 110 to the fourth mobile terminal 140 supporting the wireless LAN using a local communication method such as Bluetooth (Operation S180). For example, if the fourth mobile terminal 140 is a user's home PC, the user transmits the metadata information stored in the first mobile terminal 110 to the fourth mobile terminal 140 using Bluetooth.

The fourth mobile terminal 140 requests contents corresponding to the matching metadata from the third mobile terminal 130 through the wireless LAN, and the third mobile terminal 130 transmits the contents to the fourth mobile terminal 140 through the wireless LAN (Operation S190).

When the contents of the matching metadata are stored in an external terminal, if a client mobile terminal does not support the wireless LAN, the user transmits the metadata information to a terminal supporting the wireless LAN, and receives contents stored in the external terminal using a terminal supporting the wireless LAN.

According to an exemplary embodiment of the present invention, a local server performs a matching operation of metadata. However, the matching operation can be performed in a client mobile terminal.

According to another exemplary embodiment of the present invention, a contents share service is provided in a local area without a user's intervention. However, the user can carry a mobile terminal and establish the content share service at a specific time or in a specific place.

In another exemplary embodiment, the present invention can also be implemented as computer-readable code on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, optical data storage devices.

As described above, according to the exemplary embodiment of the present invention, a contents share method between a mobile terminal and a local server matches metadata of stored contents through a communication between the mobile terminal and the local server, thereby sharing contents desired by the user without the user's intervention.

Also, the user can communicate desired contents information with people in a bus, subway, library, etc., which forms a social network, and produces a contents flow between mobile terminals, thereby creating a new business model such as contents resale, promotion, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of communicating metadata of contents at an electronic device, the method comprising:
receiving the metadata of the contents from a first device;
receiving a contents share service request if the electronic device is determined to be located within a predetermined area;
transmitting a response to the contents share service request for an approval of contents share service; and
establishing a communication channel with a second device, wherein the communication channel is a traffic channel available to the second device;
receiving metadata from the second device; and
transmitting the metadata information of the contents to the second device based on a result of matching the metadata of the contents from the first device and the metadata from the second device.

2. The method of claim 1, wherein the metadata from the second device is generated based on a keyword input by a user.

3. The method of claim 1, wherein the metadata from the second device is generated based on an analysis of a user's contents usage history.

4. The method of claim 1, further comprising establishing a connection with a base station for contents share service.

5. The method of claim 1, wherein the transmitting comprises transmitting, to the second device, the metadata information which enables the second device to request contents corresponding to the matched metadata and to receive the requested contents from the first device.

6. The method of claim 5, wherein the metadata information comprises at least one of a URI of the requested contents and identification information in a P2P network.

7. An apparatus for communicating metadata of contents, the apparatus comprising:
a communication device configured to receive the metadata of the contents from a first device, to receive a contents share service request if the apparatus is determined to be within a predetermined area, to transmit a response to the contents share service request for an approval of contents share service, and to establish, with a second device, a communication channel which is a traffic channel available to the second device, and to receive metadata from the second device;
a metadata matching device configured to match the metadata of the contents from the first device and the metadata from the second device;
wherein the communication device is further configured to transmit the metadata information of the contents to the second device based on a matching result.

8. The apparatus of claim 7, wherein the metadata from the second device is generated based on a keyword input by a user.

9. The apparatus of claim 7, wherein the metadata from the second device is generated based on an analysis of a user's contents usage history.

10. The apparatus of claim 7, wherein the communication device is further configured to establish a connection with the base station for contents share service.

11. The apparatus of claim 7, wherein the communication device is further configured to transmit, to the second device, metadata information which enables the second device to request contents corresponding to the matched metadata and to receive the requested contents from the first device.

12. The apparatus of claim 11, wherein the metadata information comprises at least one of a URI of the requested contents and identification in a P2P network.

13. A non-transitory computer readable recording medium storing a program for executing the method of claim 1.

* * * * *